United States Patent [19]
Lee

[11] Patent Number: 5,907,670
[45] Date of Patent: May 25, 1999

[54] DISTRIBUTED PROCESSING METHOD FOR CHECKING STATUS OF PROCESSOR IN ELECTRONIC SWITCHING SYSTEM

[75] Inventor: Kwang-Bae Lee, Daegukwangyeok, Rep. of Korea

[73] Assignee: SamSung Electronics Co., Ltd., Suwon, Rep. of Korea

[21] Appl. No.: 08/685,585

[22] Filed: Jul. 24, 1996

[30] Foreign Application Priority Data

Jul. 24, 1995 [KR] Rep. of Korea ........................ 95/21893

[51] Int. Cl.⁶ .................................................... G06F 11/16
[52] U.S. Cl. ................. 395/182.02; 379/12; 395/182.01; 395/200.31
[58] Field of Search .................... 395/182.02, 182.08, 395/182.09, 183.09, 185.09

[56] References Cited

U.S. PATENT DOCUMENTS

| | | | |
|---|---|---|---|
| 3,912,873 | 10/1975 | Skaperda | 370/217 |
| 4,123,794 | 10/1978 | Matsumoto | 364/132 |
| 4,387,278 | 6/1983 | Hayes et al. | 379/12 |
| 4,633,467 | 12/1986 | Abel et al. | 395/183.21 |
| 4,972,453 | 11/1990 | Daniel, III et al. | 379/10 |
| 5,008,881 | 4/1991 | Karol | 370/431 |
| 5,105,420 | 4/1992 | Ardon et al. | 370/216 |
| 5,241,579 | 8/1993 | Kim et al. | 379/10 |
| 5,276,727 | 1/1994 | Kim et al. | 379/29 |
| 5,291,613 | 3/1994 | Hirasawa et al. | 395/200.31 |
| 5,461,662 | 10/1995 | Hanai | 379/9 |

*Primary Examiner*—Ly Hua
*Attorney, Agent, or Firm*—Robert E. Bushnell, Esq.

[57] ABSTRACT

An electronic switching system having a plurality of processors connected to an internal switching network in a chain structure of a linked list form and a maintenance processor for checking status of each individual processor connected to the internal switching network. The status of the processors is checked through a mutual status checking process between unit processors, and if any processor contains any abnormality, such abnormal status of the processor is notified to the maintenance processor.

12 Claims, 4 Drawing Sheets

5,907,670

DISTRIBUTED PROCESSING METHOD FOR CHECKING STATUS OF PROCESSOR IN ELECTRONIC SWITCHING SYSTEM

CROSS-REFERENCE TO RELATED APPLICATION

This application makes reference to, incorporates the same herein, and claims all benefits accruing under 35 U.S.C. §119 from an application for Distributed Processing Method For Checking Status Of Processor In Electronic Switching System earlier filed in the Korean Industrial Property Office on Jul. 24, 1995, and there duly assigned Serial No. 21893/1995.

BACKGROUND OF THE INVENTION

1. Technical Field

The present invention relates to an electronic switching system having a plurality of processors performing operation, maintenance and status management of a plurality of processors, and more particularly, to a method of checking a status of each individual processor in an electronic switching system.

2. Background Art

In general, conventional electronic switching system such as disclosed in U.S. Pat. No. 5,105,420 for Method And Apparatus For Reconfiguring Interconnections Between Switching System Functional Units issued to Ardon et al. is a multi-processor system having an internal switching network, a plurality of processors each connected to the internal switching network and a maintenance processor. The maintenance processor typically provides the system-level interfaces required to operate, administer, and maintain the switching system. Periodically, the maintenance processor sequentially scans each individual processor through an internal switching network for status information of the processors connected to the internal switching network.

Conventional scheme for the electronic switching system to detect the status including any internal abnormality that occurs in each individual processor requires that the maintenance processor to periodically perform a message transmission and reception operation for checking the status of all the processors connected to the switching system. Abnormality of the processor, however, affects operation of the maintenance processor as a fixed load and may therefore give rise to a busy hour fault. Moreover, as a means to communicate with all the processors, the maintenance processor is typically arranged in a far path of the internal switching network. This arrangement, however, frustrates the efficiency of the internal switching network for the message communication. In addition, if status faults coincidentally occur in the plurality of processors simultaneously, a lot of change requests of the processor status table must be simultaneously received by the maintenance processor, and changing jobs must be carried out at the same time. This excessive overload of the maintenance processor frequently forces the maintenance module to be down. As a result, access to the electronic switching system can be cut off completely and operational functions such as data back-up or processor loading can be paralyzed.

SUMMARY OF THE INVENTION

Accordingly, it is therefore an object of the present invention to provide an electronic switching system comprising a plurality of processors and a maintenance processor performing operation and maintenance and a distributed processing method for mutually checking status of each individual processor for reducing load imposed on the maintenance processor.

It is another object to provide a distributed processing method capable of checking the status of processors interconnected to an internal switching network without requiring the use of a separate hardware.

It is further another object to provide a distributed processing method for checking the status of a plurality of processors connected to an internal switching network in an electronic switching system capable of preventing operational overload of a maintenance processor when status change requests indicating occurrence of abnormally are simultaneously received from the processors to the maintenance processor.

These and other objects of the present invention can be achieved by an electronic switching system having a plurality of processors connected to an internal switching network in a chain structure of a linked list form and a maintenance processor for checking status of each individual processor connected to the internal switching network. The status of the processors is checked through a mutual status checking process between unit processors, and if any processor contains any abnormality, such abnormal status of the processor is notified to the maintenance processor. As contemplated by the present invention, only when the processor is in an abnormal status, the checked status of the processor is notified to the maintenance processor so as to reduce the load imposed on the maintenance processor. If the status change requests are simultaneously received by the maintenance processor due to the faults that coincidentally occur in the plurality of processors, the maintenance processor processes all of the requests at given time intervals without having to process all requests simultaneously.

The present invention is more specifically described in the following paragraphs by reference to the drawings attached only by way of example.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
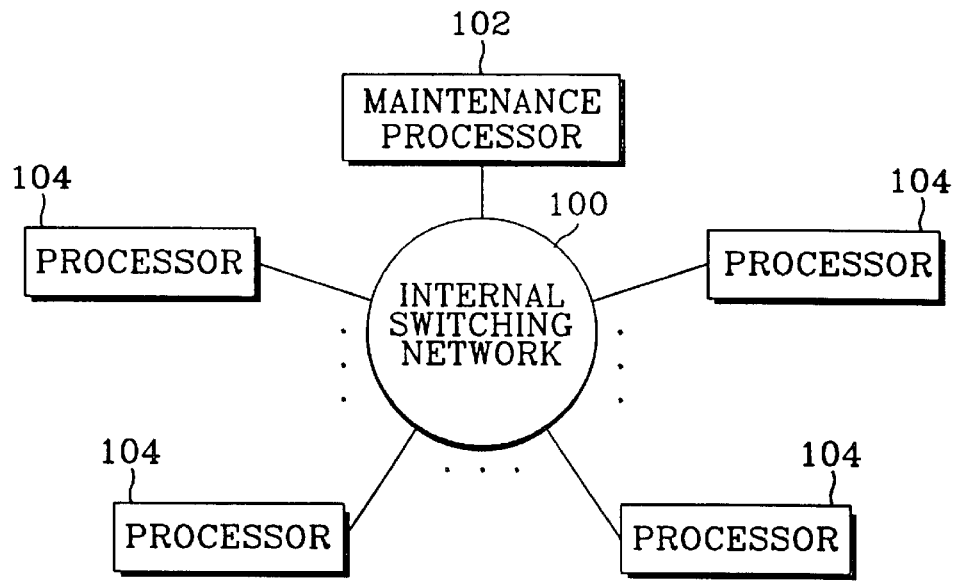
FIG. 1 is a diagram illustrating a structure of a typical electronic switching system.

Referring now to the drawings and particularly to FIG. 1, which illustrates a typical electronic switching system comprising an internal switching network 100, a plurality of processors 104 wired-connected to the internal switching network 100 and a maintenance processor 102 serving as a common module for providing the system-level interfaces required to operate, administer, and maintain the switching system. The maintenance processor periodically scans each individual processor through an internal switching network 100 for status information of the processors connected to the internal switching network 100, including the maintenance of abnormalities of software and hardware elements of the processors such as a processor board or a network cable for communication etc. Information on the status of processors is stored as data base DB, and a status table including path information for efficiently controlling communication between processors is controlled as an on-line data. On-line data used during the communication between processors represents the present status of the processors and therefore, identity of data should be maintained in all the processors within the system.

Conventional scheme for the electronic switching system to detect the status including any internal abnormality that occurs in each individual processor requires that the maintenance processor to periodically perform a message transmission and reception operation for checking the status of all the processors connected to the switching system. As described previously, abnormality of the processor, however, affects operation of the maintenance processor as a fixed load and may therefore give rise to a busy hour fault. Moreover, since the maintenance processor is typically arranged in a far path of the internal switching network, such arrangement often frustrates the efficiency of the internal switching network for the message communication. In addition, if status faults coincidentally occur in the plurality of processors simultaneously, a lot of change requests of the processor status table must be simultaneously received by the maintenance processor, and changing jobs must be carried out at the same time. This excessive overload of the maintenance processor frequently forces the maintenance module to be down. As a result, access to the electronic switching system can be cut off completely and operational functions such as data back-up or processor loading can be paralyzed.

Figure 2:
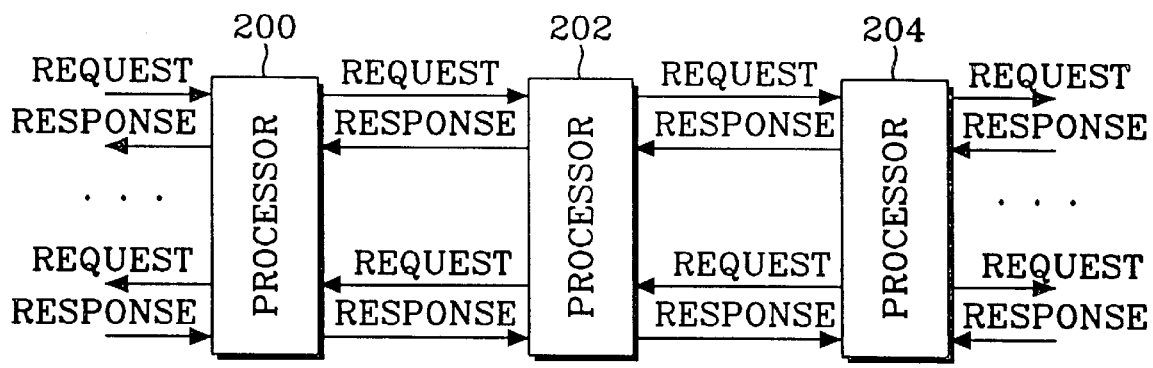
FIG. 2 is a conceptual diagram illustrating a distributed processing method for checking status of each individual processor connected to an internal switching network in a chain structure according to the principles of the present invention.

Turning now to FIG. 2 which illustrates a custom arrangement of an electronic switching system in which all processors are mutually interconnected in a chain structure. A distributed processing method for checking status of each individual processor connected to an internal switching network is mutually performed by adjacently situated and inter-connected processors.

First, in order to check the status of processors by using a distributed processing method as contemplated by the present invention, an ID Table where inherent identifications ID previously designated for all of the packaged processors are listed, is provided as corresponding data base DB. This ID Table is fundamentally provided in the electronic switching system, and may be provided in different forms. Further, a path Table of the processor which is controlled as on-line data can be provided as shown in the following Table <1> having an arrangement where logical ID values of the processor are indexed and then the paths of processors are respectively matched corresponding to the indexed ID values.

TABLE 1

| D-INDEX | D-PATH |
|---------|--------|
| 1 | 0010 |
| 2 | 0020 |
| 3 | FFFF |
| 4 | 0030 |
| 80 | 0500 |
| 81 | 0510 |
| 82 | 0520 |

Table <1> as contemplated by the present invention is formed on the supposition that all the processors within the switching system are normal status. The D-INDEX is an index obtained from the processor ID. The D-PATH contains inherent path values representing the present status of paths of the processors and is used a pointer for indicating a physical address of the processors interconnected in the switching system. Accordingly, the status of the processor can be controlled by regulating the values of the D-PATH. For example, when a processor is packaged and is operating normally, the D-PATH has an inherent value. When the processor is unpackaged or is operating abnormally, the value of D-PATH is denoted as a mark "FFFFH" indicating a dummy value. This path Table is identically controlled for all processors by the maintenance processor serving as a master processor and is used upon a status check of an adjacent processor by the unit processor. Upon the status check of the processor, it is not necessary to use the whole path Table and therefore, in order to check an identity of data, a distributed processing method of mutually comparing calculated values after calculating a check sum value for the D-PATH is used. As contemplated by the present invention, the processor path Table is used as a source Table for checking the status of the processor by the adjacent processors communicating the messages to each other, and the identity of data between processors is maintained by always checking the processor path Table during the periodic status checking operation.

Refer back to FIG. 2 which illustrates a distributed processing method capable of checking the status of all the processors respectively acting as a unit object within the system. All the processors in the electronic switching system are logically inter-connected in a chain structure. For example, processors 200, 202 and 294 are inter-connected in adjacent with each other in a chain structure and their path values are contained in the processor path Table as shown in Table <1>. The status of the processor 202 is checked by adjacent processors 200 and 204, and the status of each of the processors 200 and 204 is checked by a preceding or a succeeding processor connected in a dual link chain structure including the processor 202. For example, the status of processor 200 is checked by a succeeding processor 202 or a preceding processor (not shown) in the dual link chain structure. Similarly, the status of processor 204 is checked by a preceding processor 202 or a succeeding processor (not shown) in the dual link chain structure. According to the distributed processing method of the present invention, the processors 200 and 202 mutually check the status of each other by performing a fundamental operation which repeats the periodic job requesting the check sum value of the processor path to the adjacent processor. An abnormal status of the processor 202, for example, is checked by its adjacently connected processor 200 or 204 in a processor path table. Once the abnormal status of the processor 202 is checked, the result is notified to the maintenance processor by the same adjacently connected processor 200 or 204.

After that, the abnormal processor 202 is then excluded from the processor path table and is excluded from the chain structure used for checking the status of the next processor.

Figure 3A:
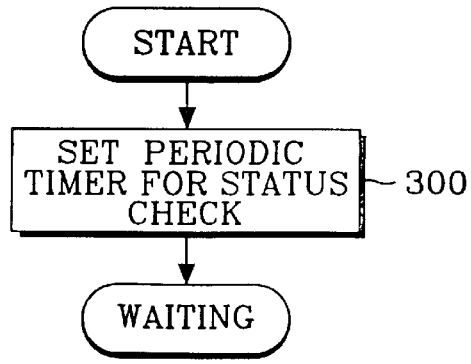
FIGS. 3A, 3B and 3C are flowcharts illustrating a processor status checking operation of each unit processor according to the principles of the present invention.
Figure 3B:
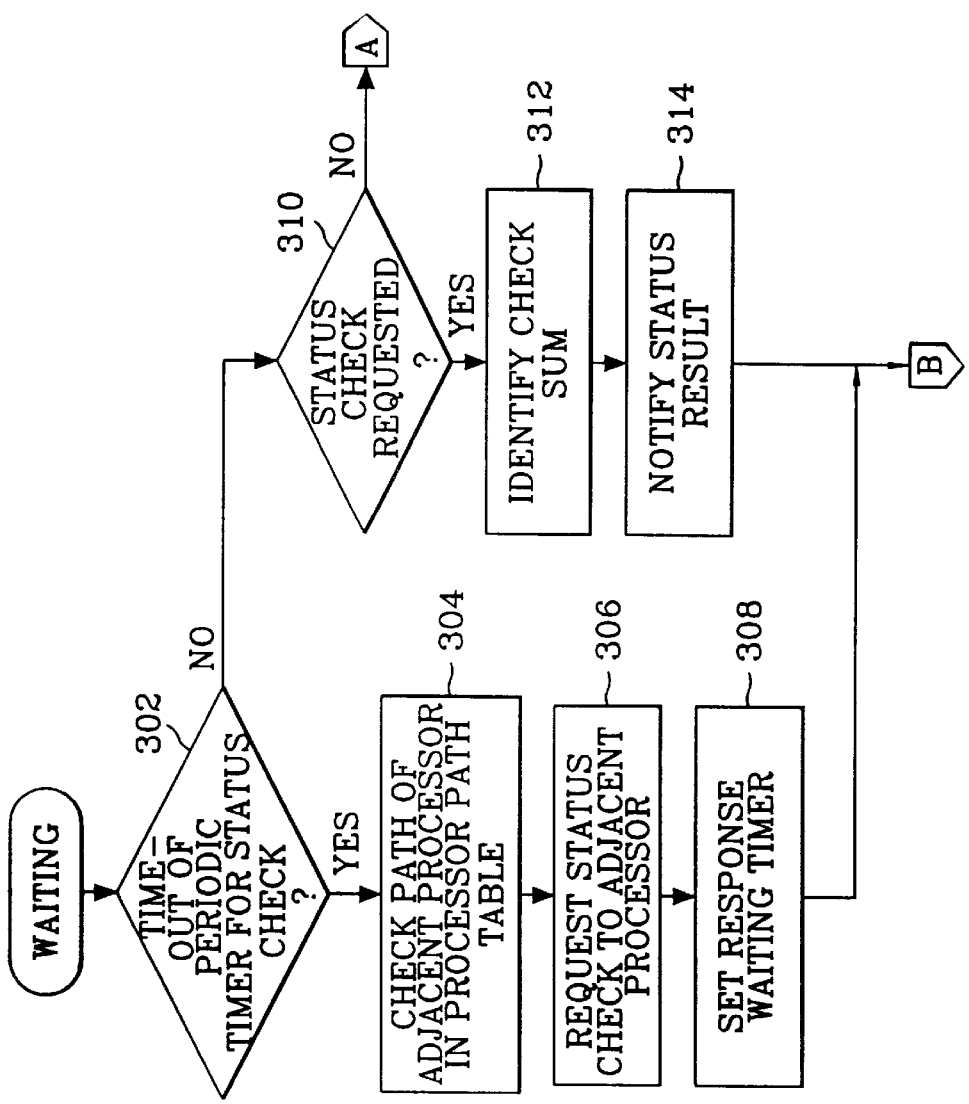
Figure 3C:
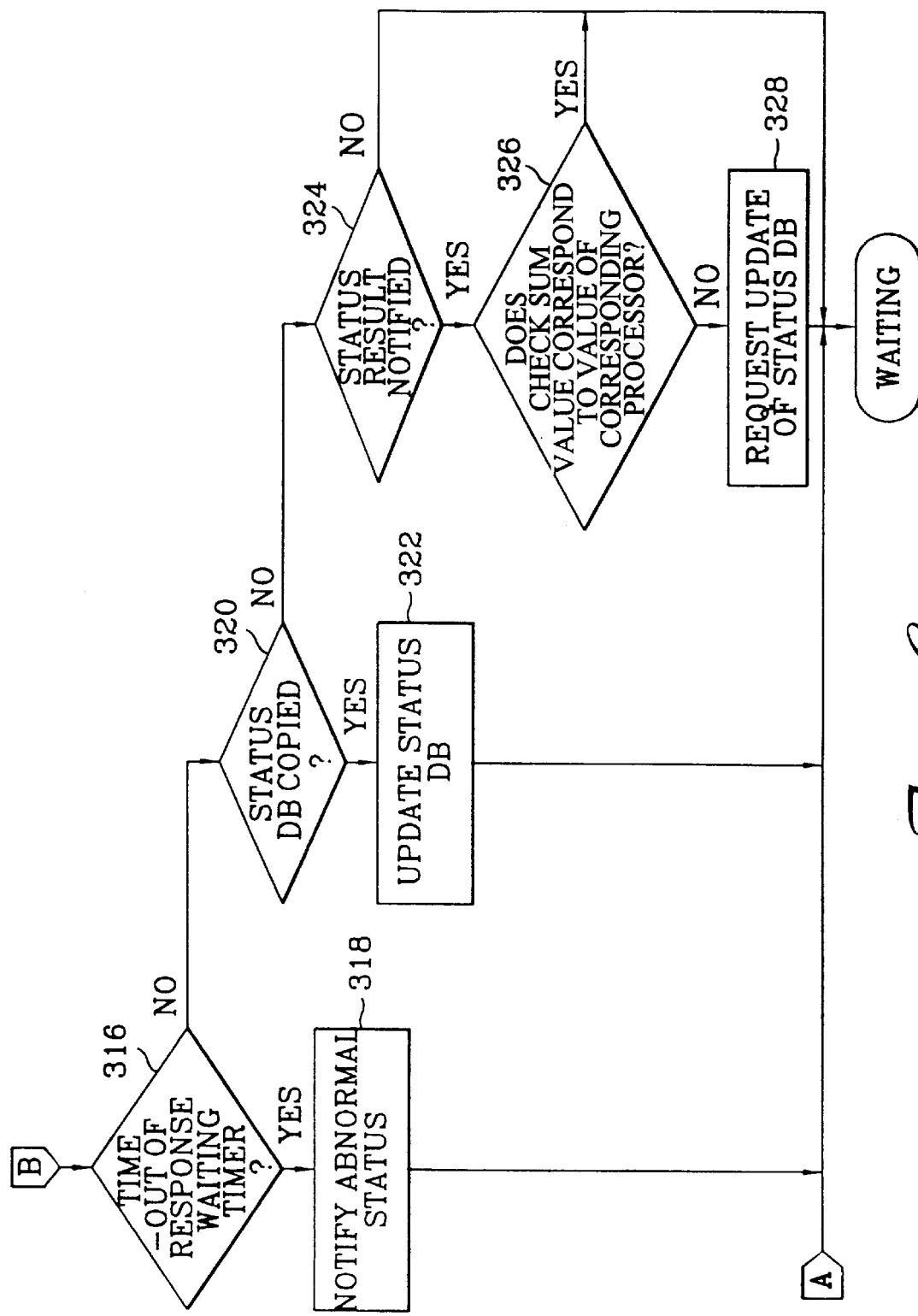

FIGS. 3A, 3B and 3C illustrate a processor status checking operation of the unit processor in the electronic switching system according to the principles of the present invention. The checking operation is performed identically in all unit processors 104 shown in FIG. 1.

First, each of processors 200, 202, 204 etc. as shown in FIG. 2 waits after its periodic timer is for the status check at step 300. When a time-out of the periodic timer contained in the processor for the status check is ascertained at step 302, the corresponding processor searches the processor adjacent thereto in the processor path Table of Table <1> at step 304. Once the path of the adjacent processor in the processor path Table is checked, the corresponding processor sends a message requesting the status check sum of the path Table of the adjacent processor at step 306, and then sets a response waiting timer at step 308.

At this time, the corresponding processor determines whether a response is received from the adjacent processor within a time-out period set by the response waiting timer at step 316. When the response is received from the adjacent processor within the time-out period set by the response waiting timer at step 316, the corresponding processor compares the received check sum value with its own value. When the received check sum value does not correspond to its own value, the corresponding processor requests a copy of the master processor path Table to the maintenance processor 102 in steps 324 through 328. If the adjacent processor is in the normal status, the mutual check by the message continues.

If, on the other hand, the response is not received within the time-out period set by the response waiting timer at step 316, the corresponding processor determines that the adjacent processor is in the abnormal status and notifies such an abnormal status to the maintenance processor 102 at step 318. Since the processors are connected in the dual link structure, if two abnormal processors are detected to be notified and then abnormalities thereof are identical to each other, the maintenance processor accepts a request from processor having lower logical processor ID, thereby preventing unnecessary status checking job. Furthermore, when the abnormal status notice is received by the maintenance processor, the status of the processor is checked, and then if the abnormal status of the processor is checked, the master processor path Table is changed and the changed path Table is copied to all the processors.

Figure 4:
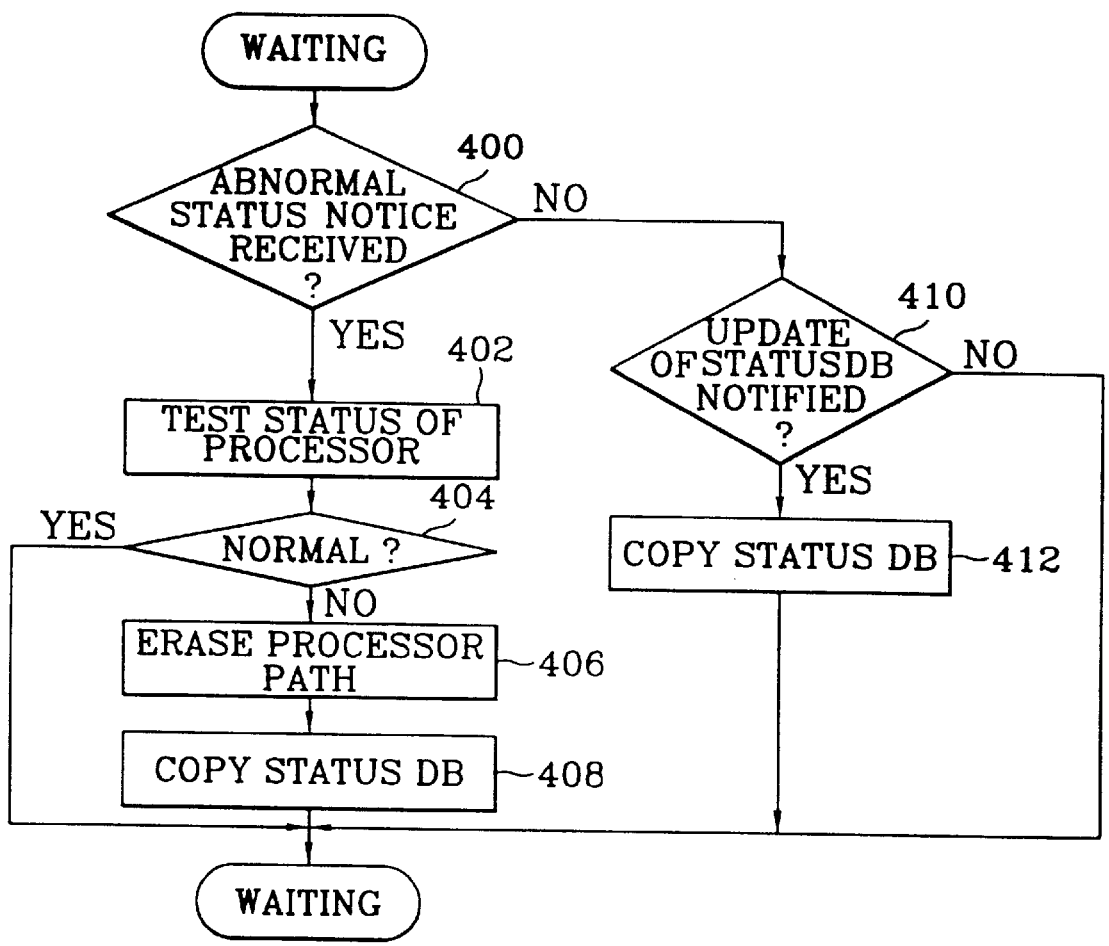
FIG. 4 is a flowchart illustrating a processor status controlling operation of a maintenance processor according to the principles of the present invention.

Turning now to FIG. 4 which illustrates a processor status controlling operation of the maintenance processor according to the principles of the present invention. The process of performing the test for checking the status of the processor and performing the copy of the master processor path Table is described as follows.

When the abnormal status of the corresponding processor is received at step 400, the maintenance processor 102 performs the test for checking the status of the corresponding processor to determine whether the corresponding processor is in a normal status at steps 402 and 404. As a result of the test, if the corresponding processor is in the abnormal status at step 404, the corresponding processor is processed as the dummy (FFFFH) in the processor path Table of Table <1> and then the status DB is copied to be notified to all processors 200, 202, 204 etc. inter-connected in a dual link chain structure as shown in FIG. 2. Thereafter, the abnormal processor is erased in a list for the status check and no more check is carried out. However, since the maintenance processor 102 controls the loading, if the fault is recovered and thus, the corresponding processor is ascertained as the normal status, that is, if an updated status DB is notified, the maintenance processor 102 reenters the corresponding processor in the processor path Table of the Table <1>, and copies the status DB in order to notify the copied status DB to all processors at steps 410 and 412.

As contemplated by the present invention, if many processors inter-connected in the electronic switching system are found abnormal, a lot of requests are simultaneously received by the maintenance processor and if the processor path Table is changed, overload due to the update of the DB can not be carried out. In order to resolve this problem, the job has to be carried out after time-out of the timer set based upon a data copy time, so that the next job can be received at a given time interval every time one request is processed. The time interval has to be designated based upon an actual value of the updated DB by a method of sending and loading a broadcasting message. Although the status checking job is carried out at given time intervals, unless the processor path Table is changed, the change request is continued and accordingly, the status checking job is not generated.

As described in the present invention, it is possible for the unit processors to mutually check the status of each other, the corresponding function can be distributed and also be regionalized. Accordingly, the load of the maintenance processor having a central controlling structure can be reduced. Furthermore, the status of the processor can be checked only by the software function without requiring the use of separate hardware elements. In addition, change requests simultaneously received are processed at given time intervals and therefore, the overload of the maintenance processor can be prevented.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof Therefore, it is intended that the present invention not be limited to the particular embodiment disclosed as the best mode contemplated for carrying out the present invention, but that the present invention includes all embodiments falling within the scope of the appended claims.

What is claimed is:

1. A distributed processing method for checking a status of each unit processor in an electronic switching system having a maintenance processor for controlling operation of a plurality of unit processors within said electronic switching system, said method comprising the steps of:

interconnecting all unit processors in a dual link chain structure for mutual communications with adjacently situated and interconnected unit processors;

checking a status of a designated one of said unit processors interconnected in said dual link chain structure by a mutual status check from said adjacently situated and interconnected unit processors; and notifying an abnormal status of said designated unit processor to said maintenance processor, when said designated unit processor exhibits an abnormal status.

2. A distributed processing method for checking a status of a unit processor in an electronic switching system having a maintenance processor for controlling operations of a plurality of unit processors within said electronic switching system, said method comprising the steps of:

indexing identification values of all the unit processors and then forming a processor path table in a structure where a path of each processor is matched corresponding to each of the indexed identification values of said unit processors;

periodically performing a mutual status check between unit processors adjacent to each other by using said processor path table; and controlling said processor path table according to the status check of said unit processor.

3. The method of claim 2, further comprised of said processor path table comprising indexes in accordance with identifications of all the processors and inherent path values which are matched corresponding to said indexes and indicate the present status of the processor path and the path of adjacent processors.

4. The method of claim 3, further comprised of each of said inherent path values being provided as a specific value in a situation when said unit processor is packaged to operate abnormally, and being provided as a dummy value in a situation when said unit processor is unpackaged or is operating abnormally.

5. The electronic switching system of claim 3, further comprised of each of said inherent path values being provided as a specific value in a situation when a corresponding unit processor is packaged to operate abnormally, and being provided as a dummy value in a situation when said corresponding unit processor is unpackaged or is operating abnormally.

6. A distributed processing method for checking a status of a unit processor in an electronic switching system having a maintenance processor for controlling a plurality of unit processors within said electronic switching system, said method comprising the steps of:

indexing identification values of all the unit processors and then forming a processor path table in a structure where a path of each unit processor is matched corresponding to each of the indexed identification values of said unit processors;

searching an adjacent processor in said processor path table to send a message requesting a check sum value of the processor path table of said adjacent processor and waiting for a response, upon a time-out period of a periodic timer for the status check of each unit processor;

comparing a received check sum value with a value of the corresponding unit processor, when a response is received from said adjacent processor within a designated waiting time period;

requesting a copy of a master processor path table to said maintenance processor, when said received check sum value does not correspond to the value of the corresponding unit processor, and continuing the mutual check by a message, when said adjacent processor is in a normal status;

judging said adjacent processor to be in an abnormal status, when the response is not received within said designated waiting time period, and then notifying the abnormal status of said adjacent processor to said maintenance processor;

performing a test for checking the status of said adjacent processor, by said maintenance processor; and changing said master processor path table and copying the changed master processor path table to all processors, when the abnormal status is checked through said test for checking the status of the processor.

7. The method of claim 6, further comprised of said maintenance processor receiving a request of the abnormal processor having lower logical processor identification, if two abnormal processors are simultaneously detected to be notified and then abnormalities thereof are identical to each other.

8. The method of claim 7, further comprised of said maintenance processor processing the received requests at a given time interval, when faults are coincidentally generated by said plurality of unit processors and a plurality of change requests from said plurality of unit processors are simultaneously received by said maintenance processor.

9. The method of claim 6, further comprised of said processor path table comprising indexes in accordance with identifications of all the processors and inherent path values which are matched corresponding to said indexes and indicate the present status of the processor path and the path of adjacent processors.

10. The method of claim 9, further comprised of each of said inherent path values being provided as a specific value in a situation when said unit processor is packaged to operate abnormally, and being provided as a dummy value in a situation when said unit processor is unpackaged or is operating abnormally.

11. An electronic switching system, comprising:

a maintenance processor; and a plurality of unit processors interconnected in a dual link chain structure for mutual communications with corresponding indexed identification values formed in a processor path table, each unit processor being mutually checked periodically for abnormality by adjacent unit processors by using said processor path table, and reported such abnormality to said maintenance processor for exclusion from said processor path table.

12. The electronic switching system of claim 11, further comprised of said processor path table comprising indexes in accordance with identifications of all unit processors and inherent path values which are matched corresponding to said indexes and indicate the present status of the processors.

\* \* \* \* \*